Aug. 23, 1960   R. STEINECK   2,949,833
TWIN-LENS MIRROR-REFLEX CAMERA
Filed Dec. 1, 1954
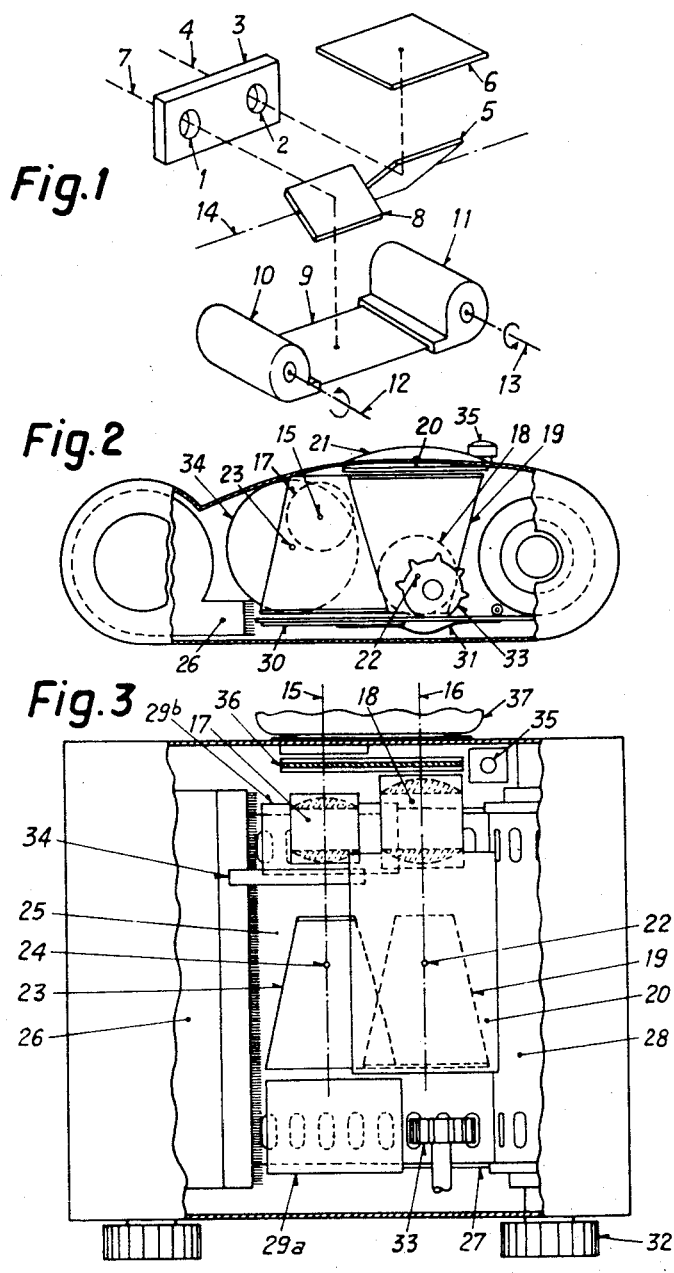
INVENTOR.
RUDOLF STEINECK

United States Patent Office 2,949,833
Patented Aug. 23, 1960

2,949,833

TWIN-LENS MIRROR-REFLEX CAMERA

Rudolf Steineck, Via Morcucco 2, Lugano, Switzerland

Filed Dec. 1, 1954, Ser. No. 472,411

Claims priority, application Switzerland Mar. 25, 1954

3 Claims. (Cl. 95—44)

The present invention is directed to a miniature mirror-reflex camera, and more particularly to such arrangement of the lenses and film within the camera which renders possible an extra-ordinarily compact structure of the camera using standard 35 mm. motion picture film.

In the conventional form of mirror-reflex cameras the viewing image must be visible, in ready-to-use position of the camera, when looking from above; the taken picture in such cameras is generally projected by the taking lens directly on a film whose plane is vertical in the ready-to-use position of the camera. Under such conditions the camera assumes relatively bulky dimensions.

Such conventional cameras, however, have the important advantage that the picture to be taken can be seen on the ground glass screen during the entire time the picture is being taken, the focusing of the viewing image on the ground glass screen being effected in a very simple manner by the displacement of the viewer lens and of the taking lens coupled therewith. In the case of such twin-lens cameras, the plane of the ground glass screen is customarily at right angles to the plane of the film which in turn is parallel to the plane of the two lenses.

Twin-lens reflex cameras of this type have therefore gained popularity, but they require due to the above arrangement a certain minimum volume and do not belong to the class of miniature cameras proper.

However, it has been found that the reflex principle would result in substantial advantages in connection with the use of miniature cameras. However, up to the present time no twin-lens miniature reflex cameras are known.

In the present invention, which uses the conventional 35 mm. motion picture film, it is possible, by using optical accessories for the production of 14 x 20 mm. images on said conventional film, and in placing the plane of the film approximately parallel to the plane of the ground glass screen, to realize a camera case measuring 57 x 46 x 17 mm. only. Such camera can conveniently be carried in a pocket, or can even be fastened to the wrist without inconvenience.

In order to make it possible to produce 14 x 20 mm. pictures on conventional motion picture film in a mirror-reflex camera of such small dimensions, the invention makes use of an optical deflecting member to project rays of the image to be photographed on a film whose plane is at right angles to the taking lens and parallel to the ground glass screen.

The object of the present invention is therefore to provide a twin-lens mirror-reflex miniature camera having one taking and one viewing lens and an optical deflecting device between the viewing lens and the ground glass screen, fitted for the use of roll film and with the parts thereof arranged to enable the camera to be built of much smaller dimensions than conventional reflex cameras heretofore known.

Another object of this invention is to provide for an interchangeable construction group comprising the taking and the viewing lenses which is so mounted as to be adjustable in the direction of the lens axes relatively to the optical deflection device, for the purpose of focusing.

A futher object of this invention is to provide a miniature mirror-reflex camera having a fastening device for a bracelet watch or a water level on the top side of the camera body.

In the preferred embodiment of the invention, the camera comprises a flat housing or casing suited for either being carried in a pocket or fastened to the wrist like a wrist watch. The casing encloses a film feed and a film take-up device, whose axes of rotation are approximately parallel to the bottom of the casing and between which the film is advanced along the bottom of the casing with the emulsion side thereof facing upwards by means of a transport mechanism when the shutter of the camera is cocked. Mounted on the top of the casing, approximately parallel to the plane of the film is the ground glass screen for viewing the image to be photographed. On the front narrow side of the casing, which is away from a user observing the image on the ground glass screen, are provided apertures for the viewing and the taking lenses, as well as for any optical accessories that may be provided for the two lenses. The axes of the lenses extend approximately parallel to the plane of the film and between the taking lens and the film there is provided an optical deflecting member arranged in an exposure chamber which extends directly up to the plane of the film and faces the taking lens as well as an adjustable shutter. A similar optical deflecting member is provided between the viewing lens and the ground glass screen.

Other objects and advantages will become apparent from the following description taken in connection with the accompanying drawings, wherein:

Fig. 1 is a perspective diagram showing the general arrangement of parts in the twin-lens mirror-reflex camera according to the invention;

Fig. 2 is a diagrammatic sketch, on an enlarged scale, of a twin-lens mirror-reflex miniature camera according to the invention, with the front wall partly broken away.

Fig. 3 is a plan view of the camera shown in Fig. 2 with the top wall of the casing partly broken away.

Fig. 1 shows the typical arrangement and the path of the rays in a mirror reflex camera according to the present invention. The taking and the viewing lenses 1 and 2 respectively are arranged by way of example, in a common lens plate 3. Line 4 designates the path of rays of the image to be photographed via the viewing lens 2 and the optical deflecting member, represented, by way of example, as a mirror 5, to the ground glass screen 6, which is similar to that of the ordinary type of twin-lens mirror-reflex camera and provides on the ground glass screen a picture right side up and identical in format size to the ultimate picture. This image on the ground glass screen serves for focusing the viewing lens 2 as well as the taking lens 1 which is coupled with it. Line 7 shows the path of the rays of the taken picture. Contrarily to the common construction of mirror-reflex cameras, an optical deflecting member is also provided here in the path of the rays for the taken picture 7, e.g. a mirror 8, which makes it possible to arrange the film 9, and thus the focal plane of the film parallel to the ground glass screen 6. In this position, the film 9 runs from a feed magazine 10 into a take-up magazine 11, i.e. it is unwound and wound around the revolution axes 12 and 13, respectively. The axes of rotation of the film rolls, therefore, contrary to previously known camera constructions, extend parallel to the axes of the lenses, as shown, which makes possible an extremely compact construction of such a reflex camera, as will be explained in further detail below.

Mirrors 5 and 8 provide preferably, for a deflection of the paths of rays 4 and 7 respectively by 90° each in mutually opposed directions. The mirror planes thus intersect each other along line 14 and stand at right angles. Instead of mirrors, other suitable deflecting devices may be used, such as 45° angular prisms with reflecting hypotenuse surfaces; also, the deflection angle may be other than 90°.

Referring to Figs. 2 and 3, in accordance with the invention, the camera is constructed for a format-size of 14 x 20 mm. on 35 mm. standard film and for being fastened to the wrist like a wrist watch. In this instance the middle axes 15 and 16 of the taking and the viewing lenses 17 and 18 respectively, lie approximately parallel to the back of the hand. Since the complete camera in this design has a casing of a size of about 57 x 46 x 17 mm., it can be fastened to the wrist without difficulty. As, however, the film plane and the plane of the image to be viewed must obviously extend parallel to a flat wall of the casing, while the image to be viewed must be visible to a user looking from above onto the camera in its position of use, such a camera design is only possible if, as in the present invention, the plane of the film and the plane of the ground glass screen for the image to be viewed extend approximately parallel to one another and if the ray paths shown in Fig. 1 is at least approximately achieved.

The camera according to Figs. 2 and 3 contains within the path of the rays 16 of the viewing lens 18 a deflection mirror in oblique position 19 and, above it, a ground glass screen 20 of corresponding size, i.e. at least 14 x 20 mm., in this instance. The plane of the ground glass screen stands perpendicular to that of the viewing lens 18, so that the deflecting mirror 19 forms an angle of 45° each with the plane of the viewing lens and with that of the ground glass screen. As can be seen from Fig. 2, the middle axis 16 of the viewing lens 18 reaches the deflecting mirror 19 at a point 22 situated below the center of the latter. As can easily be proved by constructing the path for the rays near the edge through the viewing lens 18, the required width of the deflecting mirror perpendicular to the axis 16 is smaller at its lower edge, which is nearer the viewing lens, than at its upper edge, which is nearer the ground glass screen 20. Accordingly, the deflecting mirror 19, measuring 10 x 21 x 14 mm., shows a gradual diminution of its width in the direction from the ground glass screen 20 to the viewing lens 18; yet, it supplies an image of constant size on the ground glass screen. Since, in this case, the focal lengths of both lenses are identical, the wider edge of the mirror may extend directly up to the plane of the ground glass screen. Above the ground glass screen there is provided a magnifying glass 21 to magnify the image to be viewed.

In the path of the rays 15 of the taking lens 17 there is likewise a deflecting mirror 23, which makes an angle of 45° with the plane of the lens, and thus stands at right angles with the other deflecting mirror 19; it also diminishes in width, viz. from its lower edge lying at the far end from the taking lens 17 to its upper edge lying closer to the taking lens. This varying width of the deflecting mirror 23 is permissible, because the center axis 15 of the taking lens 17 reaches the mirror at a point 24 located above its center. The image of the taking lens is projected by the deflecting mirror 23 onto the emulsion side of the standard film 25, which advances from the feed magazine 26 over a film support 27 to the take-up spool 28. The film support 27 is fitted with two retaining flaps 29a and 29b, which clasp around the film and limit the image field laterally, and against which the film is pressed via a pressing plate 30 arranged in a cutout of the film support 27 and according to the pressure exerted by the leaf spring 31 holding the pressing plate. By operating the winding key 32, the film 25 is advanced in the well-known fashion by means of a sprocket 33 engaging in the perforations of the film, advancing it each time by one frame, e.g. three perforations of a standard film, and winding it up on the take-up spool 28. As is common in miniature cameras, the winding key 32 is coupled with an adjustable shutter 34, which, in this instance, is placed behind the inner surface of the taking lens 17 in its path of rays. The shutter is actuated by operating the release button 35 or a cable release which can be screwed onto the release button. In front of the taking lens may be placed, if desired, a number of different interchangeable attachments, such as wide-angle and telephoto lenses and color filters 36.

Figs. 2 and 3 constitute only a diagrammatic showing of the construction of the camera and for the sake of simplicity the customary details of construction evident to those skilled in the art have been omitted, such as separating walls between the exposure and viewing chambers, mechanical coupling members between the winding key 32 and the film transport and shutter respectively, actuating means between the release 35 and the shutter 34, focusing means for the interconnected lenses 17 and 18 etc. The showing, therefore, has been confined to illustrating primarily those parts and novel arrangement thereof which embody the inventive idea of this application as discussed above which can now be employed by those skilled in the art to construct the novel twin-lens mirror-reflex miniature camera contemplated by this application.

If desirable, the two lenses may be of different focal lengths, which, however, calls for a change in the coupled adjusting mechanism; the transmission ratio is then equal to the square of the ratio of the two focal lengths. The two lenses 17 and 18 are preferably constructed as one common structural group, which, assuming identical focal lengths, are adjustable for focusing in the direction of the lens axes relative to the deflecting mirrors 19 and 23 respectively. If desired, this common structural group can be fitted into the body of the camera so as to be interchangeable. Focusing of the two lenses can also be performed, if the distance of the common lens group from the mirrors 19 and 23, respectively, is fixed ("fix-focus"); in this case, at least single lenses of the lens group are made adjustable in the direction of the lens axes and are coupled with each other via an adjusting mechanism with corresponding gear-ratio; or, front and colour filter lenses are incorporated for changing the focal length by interposition.

As shown in Figs. 2 and 3, the ground glass screen is fixed. Yet, this may not always answer the purpose; if desired, the ground glass screen can be fitted so as to be movable within the focusing plane of the view finder, or the image can be observed with the magnifying glass 21 without the ground glass screen. Also, a device for fastening a flat bracelet watch or a water level on the top side of the camera casing may be provided for. The camera casing may be made of a material with a low caloric conductibility.

Since it is obvious that the invention may be embodied in other forms and constructions within the scope of the claims, it is to be understood that the particular form shown is but one of these forms, and various modifications are possible, and that it does represent no limitation with respect thereto.

What I claim is:

1. A compact miniature camera adapted to accommodate 35 millimeter film, said camera comprising a substantially flat camera casing having top and bottom walls, sides, and front and back walls of short height between said top and bottom walls, film feed and take-up components immediately inside said sides and extending substantially from said back wall to said front wall on axes generally parallel to each other, said components having a film path one to the other adjacent to the inside surface of said bottom wall, taking and viewing lenses adjacent to the front wall of said casing and spaced from each other toward said sides of the casing, said lenses having axes extending between said feed and take-up components and generally parallel to the axes of said components, the axis of said taking lens being higher off said bottom than the axis of said viewing lens, an image finder at an opening in the top of said casing, and optical deflecting members in said casing between the feed and take-up components and having reflecting surfaces tilted relating to each other optically across the axes of said viewing and taking lenses respectively to divert an image of said viewing lens upward to view on said image finder and a like image of said taking lens downward onto film in said path for photographing, said deflecting member associated with said taking lens having the upper edge of its reflecting surface forward toward said taking lens, and the deflecting member associated with said viewing lens having the lower edge of its reflecting surface forward toward said viewing lens.

2. A miniature camera as set forth in claim 1, wherein said optical deflecting members are mirrors interposed between said feed and take-up components, and said mirrors are tilted at approximately a 90° angle with respect to each other for diverting the images to the view finder and the film.

3. A miniature camera as set forth in claim 2, wherein the mirror associated with the taking lens gradually diminishes in width from the lower edge thereof to the upper edge thereof toward said taking lens, and the mirror associated with the viewing lens gradually diminishes in width from the upper edge thereof to the lower edge thereof toward said viewing lens.

References Cited in the file of this patent

UNITED STATES PATENTS

| | | |
|---|---|---|
| 1,187,884 | Brigden | June 20, 1916 |
| 1,819,844 | Ross | Aug. 18, 1931 |
| 2,495,355 | Stahl | Jan. 24, 1950 |
| 2,674,932 | Tydings et al. | Apr. 13, 1954 |

FOREIGN PATENTS

| | | |
|---|---|---|
| 258,324 | Switzerland | May 2, 1949 |
| 915,523 | Germany | July 22, 1954 |